United States Patent
Vaughan et al.

(10) Patent No.: US 6,689,954 B2
(45) Date of Patent: Feb. 10, 2004

(54) SECURITY DEVICE FOR A WORKSTATION

(75) Inventors: Lynda Vaughan, Barrie (CA); Chris Robertson, Aurora (CA); Helen Kerr, Toronto (CA); Tysen Lee, Toronto (CA); Graham Sharples, Toronto (CA); Sophie Nicol, Toronto (CA); Johnny Lim, Toronto (CA); Thang Tran, Toronto (CA)

(73) Assignees: Roblinc Solutions Inc., Ontario (CA); Kerr & Company Inc., Ontario (CA)

( * ) Notice: Subject to any disclaimer, the term of this patent is extended or adjusted under 35 U.S.C. 154(b) by 0 days.

(21) Appl. No.: 09/919,865

(22) Filed: Aug. 2, 2001

(65) Prior Publication Data

US 2003/0024282 A1 Feb. 6, 2003

(51) Int. Cl.⁷ .......................... H02G 3/18; E05B 65/00
(52) U.S. Cl. ................ 174/65 G; 174/151; 174/153 G; 70/57.1
(58) Field of Search ................ 174/65 G, 151, 174/152 G, 153 G, 135, 65 R; 248/56, 551; 16/2.1, 2.2; 220/3.2, 3.3; 70/58, 57.1

(56) References Cited

U.S. PATENT DOCUMENTS

| | | | | |
|---|---|---|---|---|
| 3,584,888 A | * | 6/1971 | Lott .................. | 174/153 G |
| 4,354,651 A | * | 10/1982 | Simon ................ | 174/153 G |
| 4,397,061 A | * | 8/1983 | Kanzaka .............. | 16/2.1 |
| 4,432,520 A | * | 2/1984 | Simon ................ | 174/153 G |
| 4,626,620 A | * | 12/1986 | Plyler ............... | 174/153 G |
| 4,640,479 A | * | 2/1987 | Shely et al. ......... | 174/153 G |
| 4,656,689 A | * | 4/1987 | Dennis ............... | 174/153 G |
| 4,688,491 A | * | 8/1987 | Herrera et al. ....... | 174/152 G |
| 5,050,836 A | * | 9/1991 | Makous ............... | 70/58 |
| 5,189,779 A | * | 3/1993 | Fishel et al. ........ | 174/153 G |
| 5,406,032 A | * | 4/1995 | Clayton et al. ....... | 174/151 |
| 5,983,450 A | * | 11/1999 | Pratt ................ | 16/2.1 |
| 6,024,599 A | * | 2/2000 | Stathis et al. ....... | 174/48 |
| 6,123,492 A | | 9/2000 | Pickard | |
| 6,393,658 B1 | * | 5/2002 | Chong ................ | 174/153 G |
| 6,397,762 B1 | * | 6/2002 | Goldberg et al. ...... | 108/64 |

FOREIGN PATENT DOCUMENTS

| | | |
|---|---|---|
| DE | 196 30 916 C1 | 12/1997 |
| EP | 0 993 083 A | 4/2000 |
| EP | 1186817 | 3/2002 |
| FR | 2 081 315 A | 12/1971 |
| JP | 62-274698 | 11/1987 |

* cited by examiner

Primary Examiner—Dean A. Reichard
Assistant Examiner—Angel R. Estrada
(74) Attorney, Agent, or Firm—Bereskin & Parr

(57) ABSTRACT

A security device for attaching laptop computers and the like to a desk includes a body portion which is to be received in an aperture of the work surface of a work station or desk. The body portion includes a grommet which fits within the aperture with a flange at the top. A lock plate bears against the underside of the work surface to hold the grommet in place. A combination of pawls and lock teeth hold the lock plate in place. Within the grommet there is a cable lock to which the computing device is attached.

9 Claims, 7 Drawing Sheets

SECURITY DEVICE FOR A WORKSTATION

FIELD OF THE INVENTION

This invention relates to an apparatus for securing portable computers and the like to a workstation.

BACKGROUND OF THE INVENTION

With a view to providing greater portability of computers, computers are now offered in a format referred to as laptops. Additionally, various other office devices such as pagers, wireless communication devices, executive organizers, executive assistants and the like, have been miniaturized to facilitate portability away from a fixed workstation to enable the worker to take the devices with the worker to be used in other areas. Often, however, when the worker is not travelling or is expecting to return to the workstation, such portable equipment is left at the workstation on the work surface. When such equipment is left on a workstation work surface, the equipment becomes vulnerable to theft, particularly during periods when the workstation is not occupied such as overnight periods. The reduction in size and the portability of the equipment unfortunately makes the equipment susceptible to relatively easy theft.

As the incidents of theft have increased, attempts have been made to minimize the risk of such theft. In the most simple form, the portable computer equipment can be locked in a drawer. This typically requires disconnecting the equipment from any wiring that may be attached to the equipment when the equipment is being used at the workstation. Accordingly, portable equipment is often not locked in drawers.

Other devices have been created in an attempt to secure the equipment to the workstation without the need of disconnecting the computer and while leaving the equipment on the work surface of the workstation. One popular example is a locking cable which attaches to a portable computer at one end which can be looped around a handle or post at the other end. One difficulty with such systems is that a convenient attachment point 16 often not available in all workstations. Although a table leg or desk drawer handle may offer a point around which a cable may be looped, these locations are not particularly convenient, aesthetically pleasing nor do they typically offer the necessary security. Because of the time to hook up such devices and for other reasons, workers often do not take advantage of such locking systems and thereby leave the equipment at greater risk of theft. Accordingly, there is need for a security system which would be more aesthetically pleasing, and yet provide the requisite security while being relatively easy to use.

SUMMARY OF THE INVENTION

The security device in accordance with the invention is adapted for use in association with a workstation having an aperture. The security device comprises a grommet, which is adapted to be received within the aperture, the grommet having a grommet flange portion. The security device also has a lock plate. The security device also has a plurality of lock teeth and at least one pawl adapted to engage the lock teeth. The lock teeth are located on one of the grommet and the lock plate and the pawl is located on the other of the grommet and lock plate. The security device further comprises a cable lock.

In a preferred embodiment of the invention, there are a plurality of lock teeth located in a plurality of rows. The rows of lock teeth are located on the grommet and the lock plate comprises a plurality of pawls with the pawls arranged so that the pawls interengage with the lock teeth on the grommet.

Other features and advantages of the present invention will become apparent from the following detailed description. It should be understood, however, that the detailed description and the specific examples while indicating preferred embodiments of the invention are given by way of illustration only, since various changes and modifications within the spirit and scope of the invention will become apparent to those skilled in the art from this detailed description.

DETAILED DESCRIPTION OF THE DRAWINGS

A better understanding of the invention will be gained from reference to the attached drawings which illustrate a preferred embodiment of the invention and in which.

Figure 1:
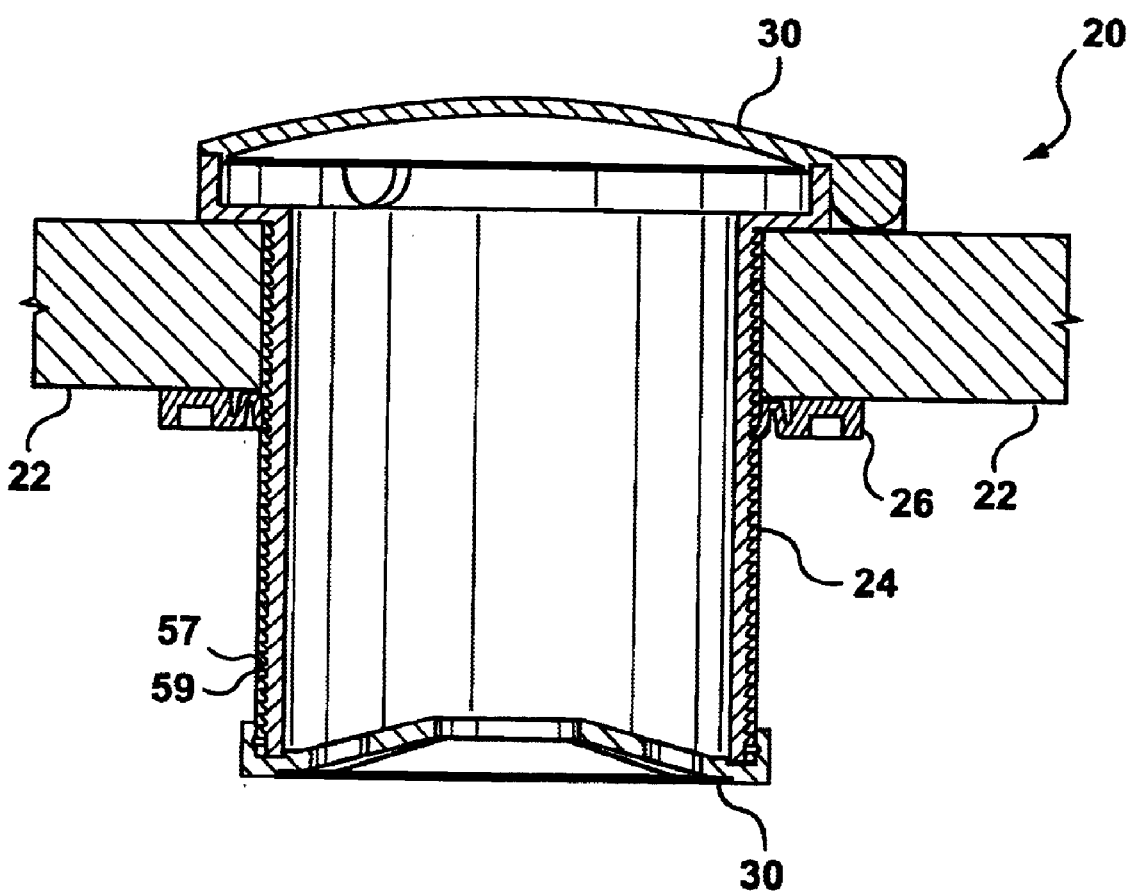
FIG. 1 is a vertical section through an assembly of a security device made in accordance with a preferred embodiment of the invention.
Figure 2:
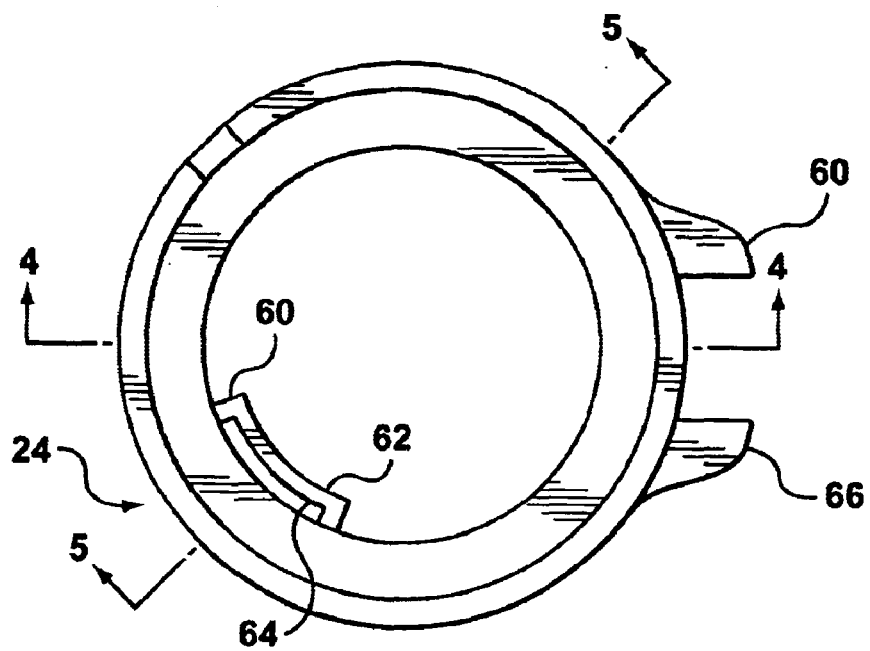
FIG. 2 is a top view of a first component of the assembly of FIG. 1.

The security device illustrated generally in FIG. 1 at 20 is shown mounted in a work surface 22. As shown in FIG. 1, the assembly comprises a grommet 24, a lock plate 26, a bottom member 28, a lid 30 and a cable lock 32 illustrated in FIG. 14.

Figure 3:
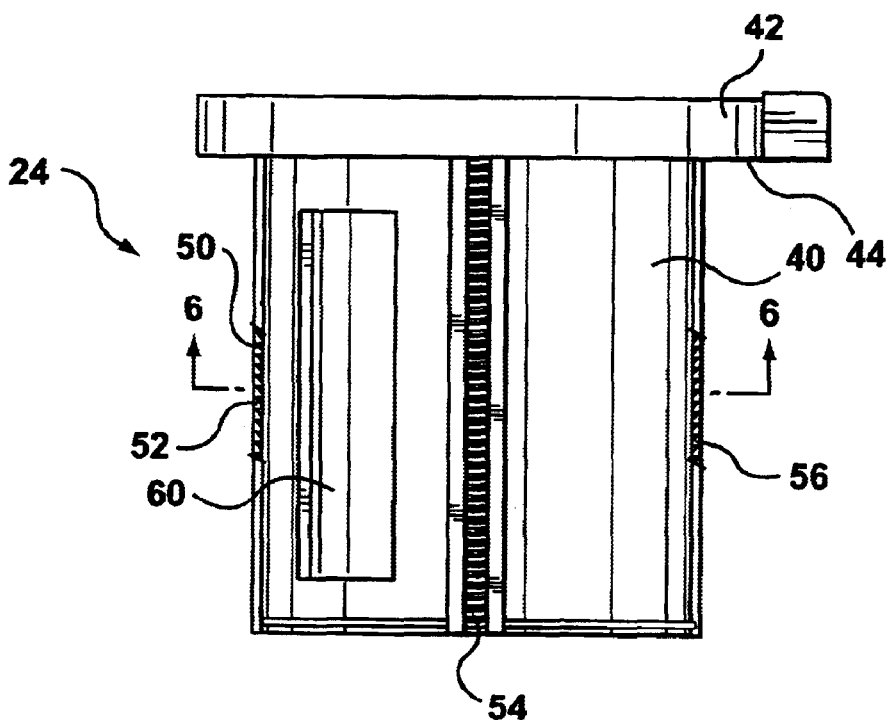
FIG. 3 is a side view of the component of FIG. 2.

The grommet 24 is illustrated in FIGS. 2, 3, 4, 5 and 6. The grommet 24 comprises a body portion 40 and a flange portion 42. The flange portion 42 has a lower surface 44 which is adapted to bear against the top of the work surface 22 in which the security device 20 is installed. The flange portion 42 may have one or more relieved sections 46 as shown in FIG. 3, the purpose of which will be explained below.

The body portion 40 of the grommet 24, preferably comprises a plurality of lock teeth 50. The lock teeth 50 may be arranged in a plurality of rows 52, 54, 56 and 58 (see FIG. 6). The individual lock teeth 50 have an upper surface 57 which is generally horizontal and a lower surface 59 which is sloped upwardly and outwardly away from the body portion 40 of the grommet 24. The body portion 40 of the grommet 24 further includes a cable lock mounting lug 60 having a radially inner face 62 and a radially outer face 64 (see FIG. 2).

Figure 4:
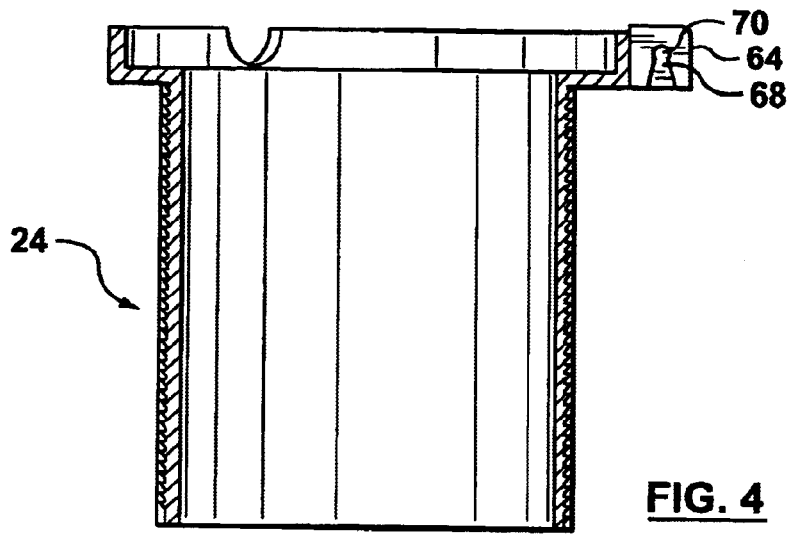
FIG. 4 is a vertical sectional view of the component of FIG. 2 taken along the line 4—4.
Figure 5:
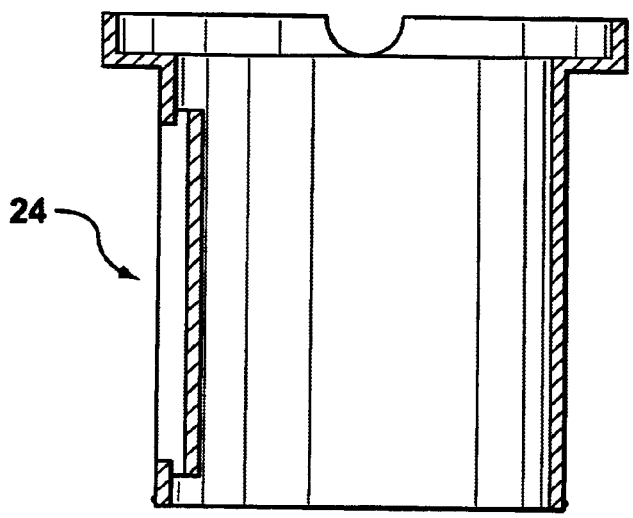
FIG. 5 is a similar vertical sectional view of the component of FIG. 2 taken along line 5—5.
Figure 6:
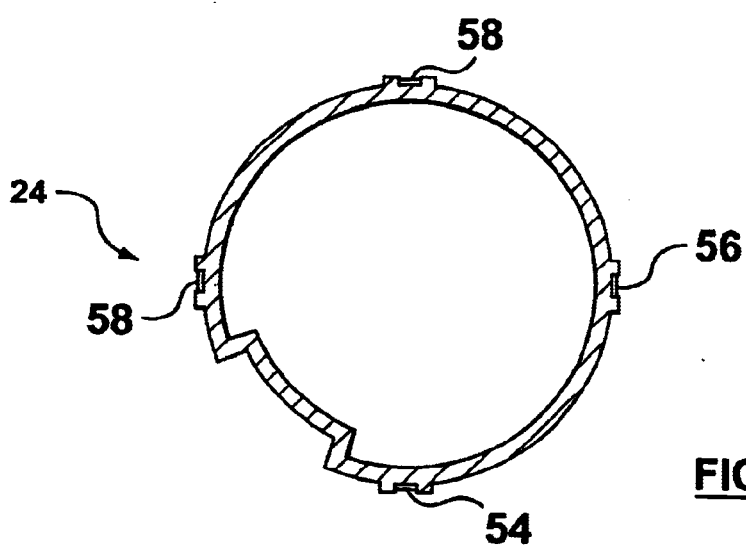
FIG. 6 is a horizontal sectional view of the component of FIG. 2 taken along the line 6—6 as shown in FIG. 3.

The flange portion 42 of the grommet 24 further comprises a pair of mounting lugs 64 and 66. The mounting lugs 64 and 66 are substantially identical. The inside vertical surface of lug 64 is illustrated in FIG. 4. The lug 64 is molded to include a relief 68 having a part circular surface 70 for receiving an axle.

Figure 7:
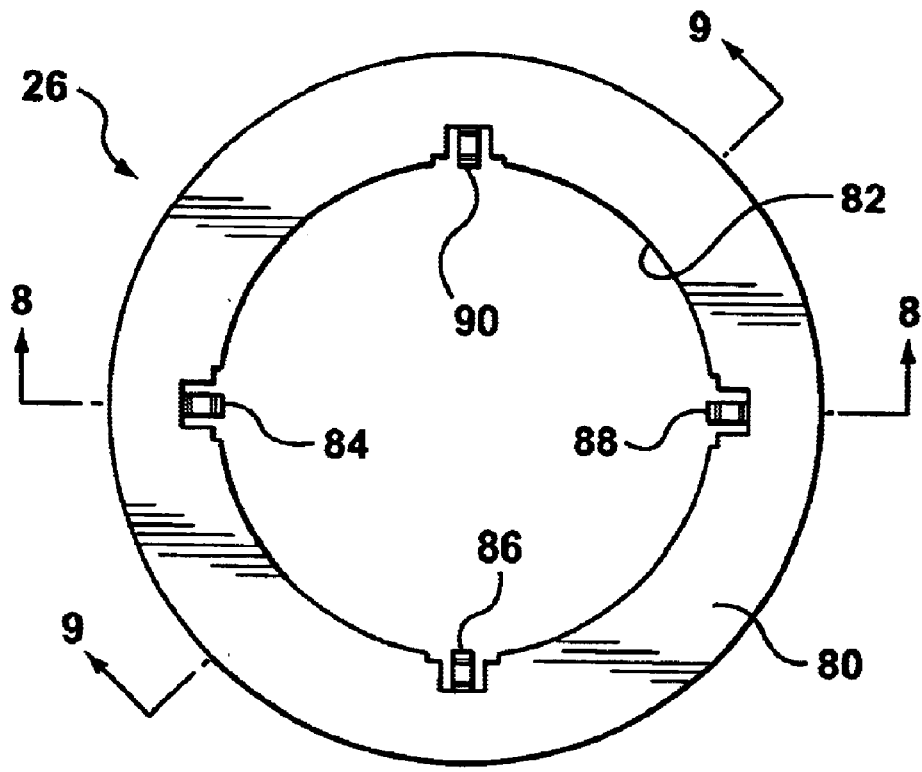
FIG. 7 is a top view of a second component of the security device of FIG. 1.
Figure 8:
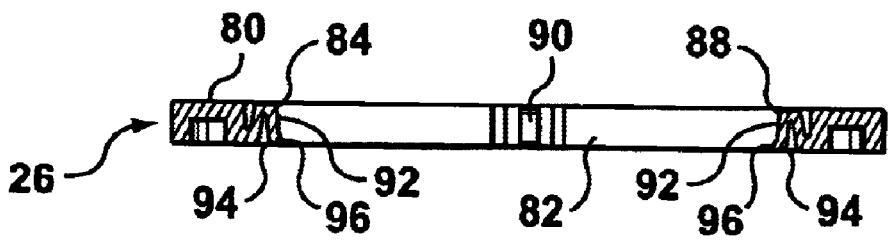
FIG. 8 is a vertical section through the component of FIG. 7 taken along the line 8—8 shown in FIG. 7.
Figure 9:
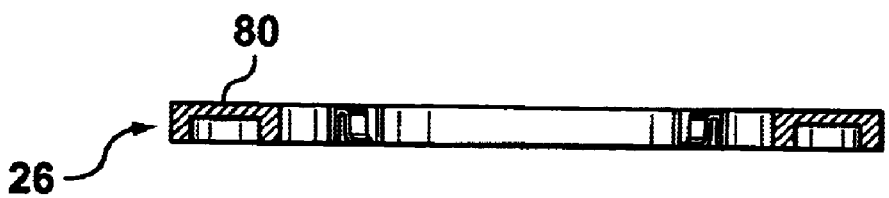
FIG. 9 is a vertical sectional view of the component of FIG. 7 taken along the line 9—9 shown in FIG. 7.

The lock plate 26 is illustrated in FIGS. 7, 8 and 9. The lock plate 26 has an upper surface 80. The lock plate 26 has an inner wall 82. Set into the inner wall 82, there are a plurality of pawls 84, 86, 88 and 90. The pawls 84, 86, 88 and 90 are equipped with a downwardly facing tang 92 which has a lower substantially horizontal surface 94 and an upper angled surface 96 extending radially upwardly and outwardly from the body portion 40 of the grommet 24.

Figure 10:
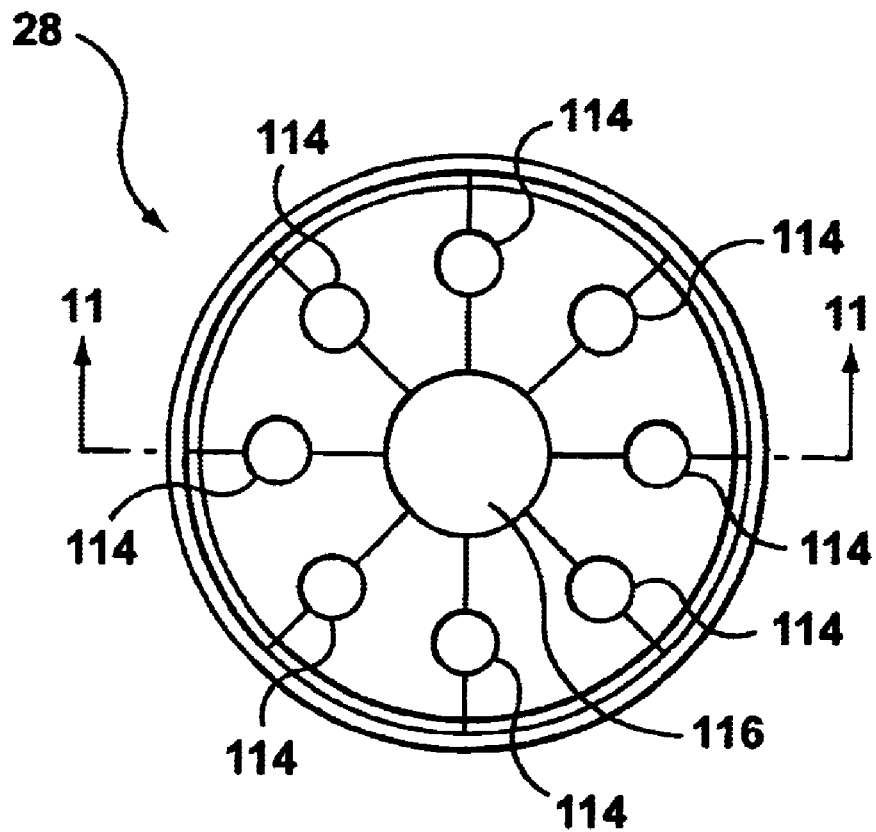
FIG. 10 is a top view of a third component of the assembly of FIG. 1.
Figure 11:
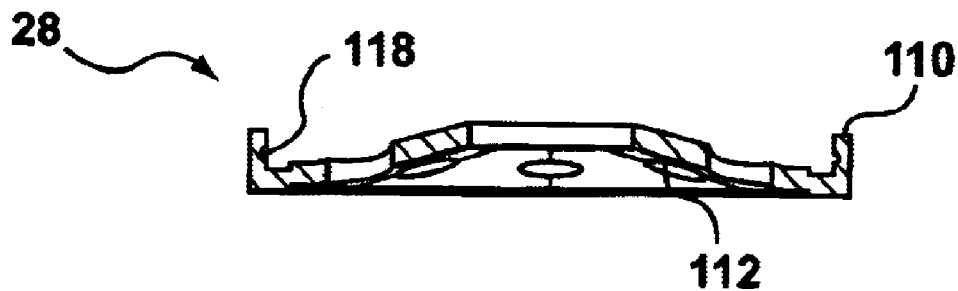
FIG. 11 is a vertical sectional view of the component of FIG. 10 taken along the line 11—11 in FIG. 10.

The bottom 28 is illustrated in FIGS. 10 and 11. The bottom includes an upwardly opening annular wall 110 and an inwardly extending wall 112. As shown in FIG. 10, the inwardly extending wall 112 comprises a plurality of apertures 114, as well as a central aperture 116. The annular wall 110 comprises an annular groove 118 extending around the inner surface of the wall 110.

Figure 12:
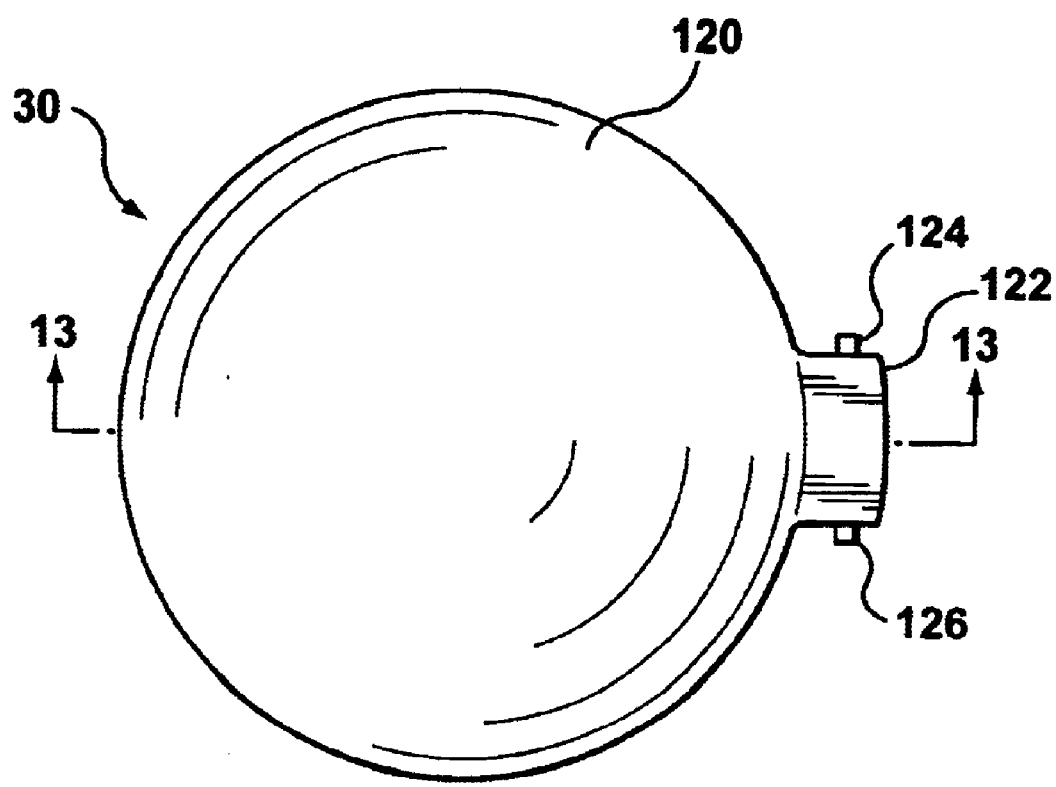
FIG. 12 is a top view of a fourth component of the assembly of FIG. 1.
Figure 13:
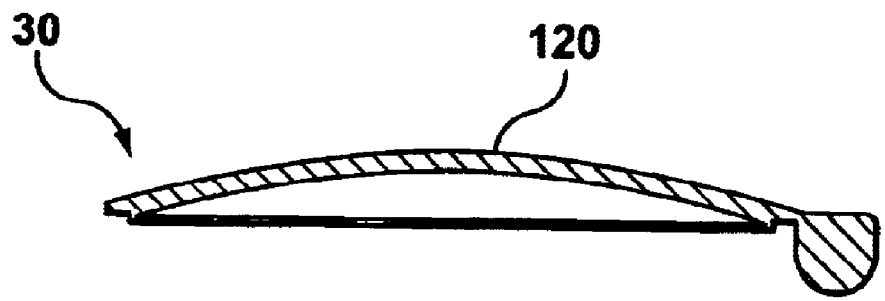
FIG. 13 is a vertical sectional view through the component of FIG. 12 taken along the line 13—13 in FIG. 12.

The lid 30 is shown in FIGS. 12 and 13. The lid 30 comprises a dome-shaped wall 120 and a mounting lug 122. The mounting lug 122 comprises a pair of axle stubs 124 and 126.

Figure 16:
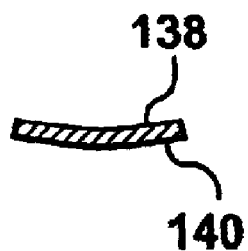
FIG. 16 is a horizontal sectional view of the component of FIG. 14 taken along line 16—16.
Figures 14, 15:
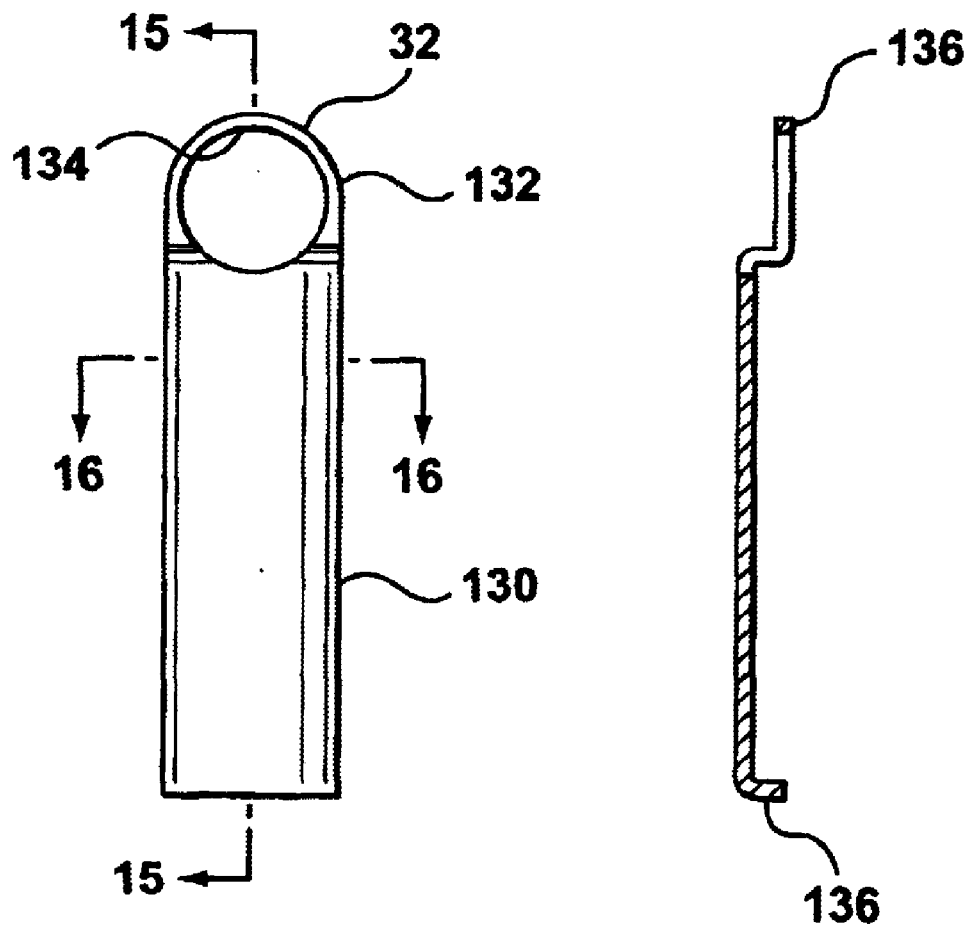
FIG. 14 is a front view of an additional component of the assembly of FIG. 1.
FIG. 15 is a vertical sectional view of the component of FIG. 15.

The cable lock 32 is illustrated in FIGS. 14, 15 and 16. The cable lock 32 comprises a central body portion 130, an upper looped portion 132 having a closed aperture 134 and a lower bent flange 136. The body portion 130 is curved as shown in FIG. 16 and has a radially inner surface 138 and a radially outer surface 140.

In order to assemble the device, the first step is to mount the cable lock 32 within the grommet 24. In order to mount the cable lock 32, the cable lock 32 is supplied as shown in FIG. 15 but without the bent flange 136 having been moved to that configuration. The cable lock is passed vertically downwardly into the grommet 24 by passing the cable lock downwardly through the flange portion 42. The cable lock is positioned so that the radially inner surface 138 of the cable lock bears against the radially outer surface 64 of the cable mounting lug 60. After the cable lock is positioned with the flanged portion 132 bearing against the top of the mounting lug 60, a tool such as a pair of pliers is used to grasp the bottom of the cable lock 32 and the bottom of the cable lock is bent to form the flange 136. The flange 136 then bears against the bottom of the lug 60. The lug 60 extends between the inner surfaces of the bent flange 136 and the flanged portion 132. Once the flange 136 is bent as shown in FIG. 15, then the cable lock 32 cannot be removed from the grommet 24 without breaking the grommet or the cable lock 32. Advantageously, the cable lock is manufactured from stamped steel. This is recommended so that the flanged portion 132 cannot be easily cut or broken by tooling that might be available within an office in the ordinary course.

In order to assemble the lid 30 to the grommet 24, the lid is placed over the grommet with the axle stubs 124 and 126 aligned with the recesses of the lugs 64 and 66. The axles 124 and 126 snap into the part circular recesses 70 (see FIG. 4). When the stub axles 124 and 126 are received in the part circular recesses, they snap into place and the lid is then pivotally mounted to the grommet for movement about a pivotal axis defined by the axles 124 and 126.

When the cable lock 32 has been mounted in the grommet 24, and the lid has been snapped into place, the security device is then ready for mounting to a work surface. In order to mount the security device 20 in a work surface, the work surface must be provided with an aperture which is relatively close to the size and configuration of the perimeter of the grommet 24. Most preferably the grommet 24 is generally cylindrical shaped as shown and a cylindrical hole can be provided in the work surface. Many modular desk systems are provided with an aperture for passage of wires and the like. Advantageously, the diameter of the grommet is selected to meet standard hole sizes where such standards have been adopted in furniture design for such workstations. The grommet is passed downwardly from the upper surface of the work surface 22 to lie within the aperture defined by the work surface. The grommet 24 is moved downwardly until the lower surface 44 of the flange portion bears against the upper surface of the work surface. (see FIG. 1)

The next step in the assembly is to pass the lock plate 26 vertically upwardly from beneath the work surface 22 until the upper surface 80 of the lock plate bears against the lower surface of the work surface 22. In assembling in the lock plate 26 to the grommet 24, the lock plate 26 is positioned so that the pawls 84, 86, 88 and 90 engage respectively with the of lock teeth rows 52, 54, 56 and 58 respectively. As the lock plate 26 is moved vertically upwardly as illustrated in FIG. 1, the sloped upper surface 96 of the tangs 92 will ride up the sloped surfaces 59 of the teeth 50 enabling movement of the lock ring toward the flange 42. Once the lock ring 26 bears against the work surface 22, the grommet has been captured on either side of the work surface 22. The lock plate 26 cannot be moved downwardly as the four pawls 84, 86, 88 and 90 will bear against the respective teeth in the rows of lock teeth 52, 54, 56 and 58. Accordingly, if an upward force is applied to the grommet from above the work surface 22, that force is restrained by the interaction of the surface 94 of the pawls and the surface 57 of the respective lock teeth thereby ensuring that the grommet cannot be removed from the lock surface without breaking the pawls or some other component.

When the grommet has been installed in the workstation, then the bottom 28 may be placed on the grommet. The bottom 28 is applied to the lower surface of the grommet. The lowermost of the locking teeth 50 will be received within the annular groove 118 in the annular wall 110. This will retain the bottom on the grommet. This will then constitute the assembly as shown in FIG. 1.

All communication or power cables and the like that are desirable to be hooked into the computer equipment can be fed up through the bottom 28 through the apertures 114 or 116 as desired. Those wires and communication cables can then extend upwardly right through the grommet 24 and may be laid in one or more reliefs 46 shown in FIG. 3. In use, the lid 30, will be pivoted downwardly so that it lies substantially horizontally over the grommet, hiding the grommet and providing a smooth finished dome to the security device. Any necessary cables may pass through the reliefs 46 and out under the edge of the lid to be available to hook into the computer device as necessary.

When it is desired to lock up the computer so that the worker may leave the workstation, then a device commonly known as a computer leash can be attached to the computer. Most computers comprise a receptacle into which the leash can be inserted and locked. The locked leash is removable from the computer only by access to a combination. The leash is first secured to the cable lock 32 by passing the leash through the closed aperture 134 in the cable lock. The leash is typically provided with a loop at one end. If the loop is passed through the aperture 134, then the remainder of the cable can be passed through the loop of the leash and the other end of the leash is then available for fixing to the computer equipment.

When it is desired to remove the computer equipment from the workstation, the leash may be disengaged from the computer and the computer taken as desired. If it is desired to take the leash along with the computer so that it may be moved to and secured at a second station, then the leash can be withdrawn through the loop in the end of the leash through the aperture 134 and then it is free to be taken along with the computer equipment.

Advantageously, the grommet 24, the lock plate 26, the bottom 28 and the lid 30 may all be made of plastic in an injection molding operation. Other materials, and other molding procedures could be used. However, as the cable lock with its closed aperture is the prime component for resisting any force applied to the computer leash it is preferable that the cable lock be made of stamped steel or other robust material.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than the foregoing description, and all changes which come within the meaning and range of equivalency of the claims are therefore intended to be embraced therein.

We claim:

1. A security device for fixing computer equipment to a workstation, said workstation having an aperture, comprising; a grommet, said grommet adapted to be received within said aperture, said grommet having a grommet flange portion, and a lock plate, said security device further comprising a plurality of lock teeth on said grommet and a plurality of pawls on said lock plate adapted to engage said lock teeth, said security device including a cable lock wherein, said lock teeth and said pawls are configured to enable movement of said lock plate toward said grommet flange portion and to restrain movement of said lock plate away from said grommet flange portion wherein, said plurality of lock teeth are located in a plurality of separate rows and said pawls are arranged on said lock plate so that as said lock plate is slid over said grommet said pawls of said lock plate engage said lock teeth, said security device further comprising a lid pivotally affixed to said grommet flange and pivotally moveable between a first position in which said grommet flange is enclosed within said lid and an open position in which the interior of said grommet is engagable by a cable, and wherein said security device includes a bottom and said bottom is mountable to an end of said grommet which is remote from said grommet flange.

2. The device of claim 1 wherein said bottom comprises at least one aperture for passing communication cables into the interior of said grommet.

3. The device of claim 2 wherein said cable lock is made of steel and said grommet is made of plastic.

4. A security device for use with a workstation having a panel with first and second opposed surfaces and an aperture extending between the opposed surfaces for securing computer equipment to the workstation, the security device comprising, a grommet, a lock plate and a cable lock, the grommet having a grommet body for extending through the aperture, the grommet having a flange portion for bearing against the first opposed surface of the panel, the lock plate having a size and configuration so that the lock plate will not pass through the aperture for bearing against the second opposed surface of the panel, and a plurality of lock teeth and at least one pawl adapted to engage the lock teeth, said lock teeth are located on said grommet and said at least one pawl is located on said lock plate, said lock teeth and said at least one pawl are configured to enable movement of said lock plate toward said grommet flange portion and to restrain movement of said lock plate away from said grommet flange portion, said lock plate comprising a plurality of pawls for inter-engaging with said lock teeth, said grommet comprising a plurality of lock teeth located in a plurality of separate rows and said lock plate comprises a plurality of pawls and said pawls are arranged on said lock plate so that as said lock plate is slid over said grommet said pawls of said lock plate engage said lock teeth, and wherein, said security device further comprises a lid pivotally affixed to said grommet flange and pivotally moveable between a first position in which said grommet flange is enclosed within said lid and an open position in which the interior of said grommet is engagable by a cable.

5. The device of claim 4 wherein said security device includes a bottom and said bottom is mountable to an end of said grommet which is remote from said grommet flange.

6. The device of claim 5 wherein said bottom comprises at least one aperture for passing communication cables into the interior of said grommet.

7. The device of claim 6 wherein said cable lock is made of steel and said grommet is made of plastic.

8. A security device for fixing computer equipment to a workstation, said workstation having an aperture comprising; a grommet, said grommet adapted to be received within said aperture, said grommet having a grommet flange portion, and a lock plate, said security device further comprising a plurality of lock teeth on said grommet and a plurality of pawls on said lock plate adapted to engage said lock teeth, said security device including a cable lock wherein, said lock teeth and said pawls are configured to enable movement of said lock plate toward said grommet flange portion and to restrain movement of said lock plate away from said grommet flange portion wherein, said plurality of lock teeth are located in a plurality of separate rows and said pawls are arranged on said lock plate so that as said lock plate is slid over said grommet, said pawls of said lock plate engage said lock teeth, wherein said cable lock comprises a closed aperture through which a cable may be passed, said cable lock is permanently attached to said grommet and, said cable lock comprises a body portion and said body portion of said cable lock includes a bent flange portion.

9. A security device for use with a workstation having a panel with first and second opposed surfaces and an aperture extending between the opposed surfaces for securing computer equipment to the workstation, the security device comprising, a grommet, a lock plate and a cable lock, the grommet having a grommet body for extending through the aperture, the grommet having a flange portion for bearing against the first opposed surface of the panel, the lock plate having a size and configuration so that the lock plate will not pass through the aperture for bearing against the second opposed surface of the panel, and a plurality of lock teeth and at least one pawl adapted to engage the lock teeth, said lock teeth are located on said grommet and said at least one pawl is located on said lock plate, said lock teeth and said at least one pawl are configured to enable movement of said lock plate toward said grommet flange portion and to restrain movement of said lock plate away from said grommet flange portion wherein, said lock plate comprising a plurality of pawls for inter-engaging with said lock teeth, said grommet comprising a plurality of lock teeth located in a plurality of separate rows and said lock plate comprises a plurality of pawls and said pawls are arranged on said lock plate so that as said lock plate is slid over said grommet said pawls of said lock plate engage said lock teeth and, said cable lock comprises a closed aperture through which a cable may be passed, said cable lock is permanently attached to said grommet, and said cable lock comprises a body portion and said body portion of said cable lock includes a bent flange portion.

* * * * *